United States Patent [19]

McCracken

[11] Patent Number: 4,898,514
[45] Date of Patent: Feb. 6, 1990

[54] TURBINE BALANCE ARRANGEMENT WITH INTEGRAL AIR PASSAGE

[75] Inventor: James R. McCracken, Palm Beach Gardens, Fla.

[73] Assignee: United Technologies Corporation, Hartford, Conn.

[21] Appl. No.: 112,857

[22] Filed: Oct. 27, 1987

[51] Int. Cl.⁴ ............................ F01D 5/10; F01D 5/18
[52] U.S. Cl. ........................................ 416/95; 416/144
[58] Field of Search .................. 416/144, 95, 96 R

[56] References Cited

U.S. PATENT DOCUMENTS

| 2,613,058 | 10/1952 | Atkinson | 416/95 X |
| 2,843,356 | 7/1958 | Hull, Jr. | 416/144 |
| 3,297,302 | 1/1967 | Spears | 416/144 |
| 3,644,058 | 2/1972 | Barnabei et al. | 416/95 |
| 3,853,425 | 12/1974 | Scalzo et al. | 416/95 |
| 3,888,601 | 6/1975 | Glassburn | 416/144 |
| 4,477,226 | 10/1984 | Carreno | 416/144 |
| 4,505,640 | 3/1985 | Hsing et al. | 416/95 X |

FOREIGN PATENT DOCUMENTS

| 129431 | 8/1950 | U.S.S.R. | 416/144 |
| 805371 | 12/1958 | United Kingdom | 416/144 |
| 2105790 | 3/1983 | United Kingdom | 416/144 |

Primary Examiner—Everette A. Powell, Jr.
Attorney, Agent, or Firm—Edward L. Kochey, Jr.

[57] ABSTRACT

A gas turbine rotor includes a disk (50) with axial dovetail slots (64) and air cooled blades (52) having mating, but shortened dovetails (66). The axial flow path (68) so formed is blocked at the far end and is in fluid communication with the blade cooling passages. Balance weights (70) fit within the openings in a manner which does not interfere with the cooling airflow.

10 Claims, 2 Drawing Sheets

TURBINE BALANCE ARRANGEMENT WITH INTEGRAL AIR PASSAGE

TECHNICAL FIELD

The invention relates to balancing of gas turbine rotors and in particular to rotors having air cooled blades.

BACKGROUND OF THE INVENTION

Gas turbine rotors rotate at high speed and any unbalance causes vibration and reduces the life of the components. Therefore, it is known to balance such rotors by selective addition of weights.

Location of balance weights on collars attached to the disks involves the additional weight of the collar and elaborate machining of the collar. Such collars are conventionally of thin cross section and therefore susceptible to handling damage. Balance weights attached thereto are usually close tolerance highly machined parts.

Depending on the weight retention means, the weights can be improperly installed, endangering balance weight retention. Removal of the balance weights is often difficult, for instance involving drilling out of a rivet. The collar may be bent or otherwise damaged during this procedure. Often the balance weights are not positively trapped so that they may come off the collar or the collar itself may crack off causing substantial damage to the engine.

Location of the weights within the disk itself often creates complicated machining and possibly causes stress concentrations at highly stressed points. Such locations may interfere with the cooling passages for air cooled blades.

It is an object of the invention to balance a gas turbine rotor in a manner to facilitate blade air cooling.

SUMMARY OF THE INVENTION

A gas turbine rotor includes a rotating disk carrying a plurality of air cooled blades. A supply of high pressure cooling air is located on a first side of the disk. The disk has a plurality of substantially axially extending dovetail slots through the outer edge of the disk and each blade carries a mating dovetail. This dovetail is shorter than the depth of the slots so that an axial opening or flow path is provided under the blade.

Each dovetail either includes at a second side of the disk an extending lip to the full depth of the dovetail slot or a cover plate covers the second side of the opening, so as to close the opening at the second side. Each blade also has one or more cooling flow paths through the dovetail passing through the blade in either serpentine or parallel flow relationship. A balance weight as installed is located in the second side of the axial opening and is preferably of a U-shape so that it fills less than all of the axial opening whereby there is no or minimal restriction of airflow to the blade.

DESCRIPTION OF THE PREFERRED EMBODIMENT

Figures 1, 2:
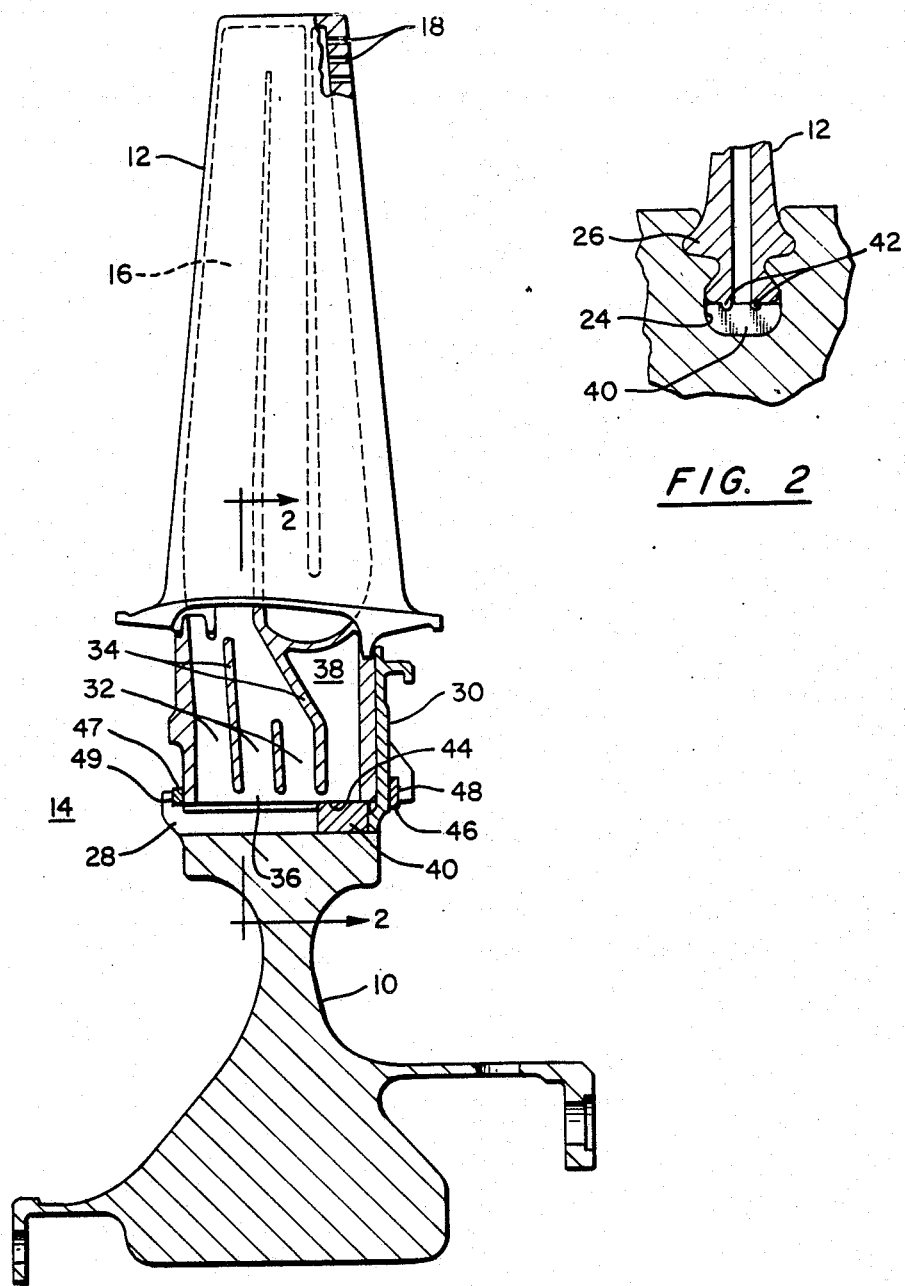
FIG. 1 is a partial section through the disk and blade of the sinuous blade cooling embodiment.
FIG. 2 is a section through FIG. 1.

The gas turbine rotor includes a disk 10 carrying a plurality of turbine blades 12. The blades are located in the hot gas stream while the supply of relatively low temperature cooling air 14 exists on a first side of the disk. The blade of the FIG. 1 embodiment is sinuously cooled with air flowing through the sinuous passage 16 and out through a plurality of downstream openings 18. The air inlet opening to each blade should be generous and substantially unrestricted to insure a sufficient flow of cooling air restricted primarily by the openings 18.

The disk 10 includes a plurality of axially extending dovetail slots 24 with each of the blades 12 carrying a dovetail 26 which mates with the slots. The dovetail is shorter than the depth of the slots so that an axial opening or passageway 28 is formed through the dovetail slot. While these slots are illustrated as directly axial, it is understood that in certain embodiments they may be at various angles, still maintaining a substantial axial component.

The blade retaining plates 30 extend to the bottom of the axial slot 24 thereby blocking the second side of the axial opening (28) and closing the end of the passage. A plate 30 is located in each axial slot.

Each blade has radial openings 32 in fluid communication with the cooling flow path 16 and with the axial opening 28. Accordingly, cooling air from the supply 14 passes through the axial opening 28 and through the passageways 32 into and through the blade. Internal support webs 34 located within the radial opening serve to strengthen the root of the blade and also function to make the flow path of air entering the blade more uniform. The inlet portion 36 of these passageways is generously sized to minimize pressure drop at this location where the cooling air must make a 90° bend.

A dead air space 38 is a lightening hole and forms no significant portion of the airflow path.

The rotor assembly is spun on a balancing machine with the amount and location of needed weights being determined. The required weights 40 are then located at appropriate locations within the axial opening 28. Each blade has rails 42 toward the first or inlet side of the disk with these rails terminating toward the second side forming a recess 44. The weight 40 is located at the second side being retained from axial movement toward the upstream side by the rails. It is restrained from axial movement in the other direction by the blade retaining plates 30 which in turn are held in place by a snapping 46 which engages slots 48 on the disk. A snap ring 47 engages slots 49 for axial retention of the blades in the other direction. Accordingly, the blades are restrained from axial movement in either direction and the weight is retained at the upstream location. It can be seen that the flow path from the air supply 14 through the axial opening 28 and into the blades is unrestricted.

Figures 3, 4:
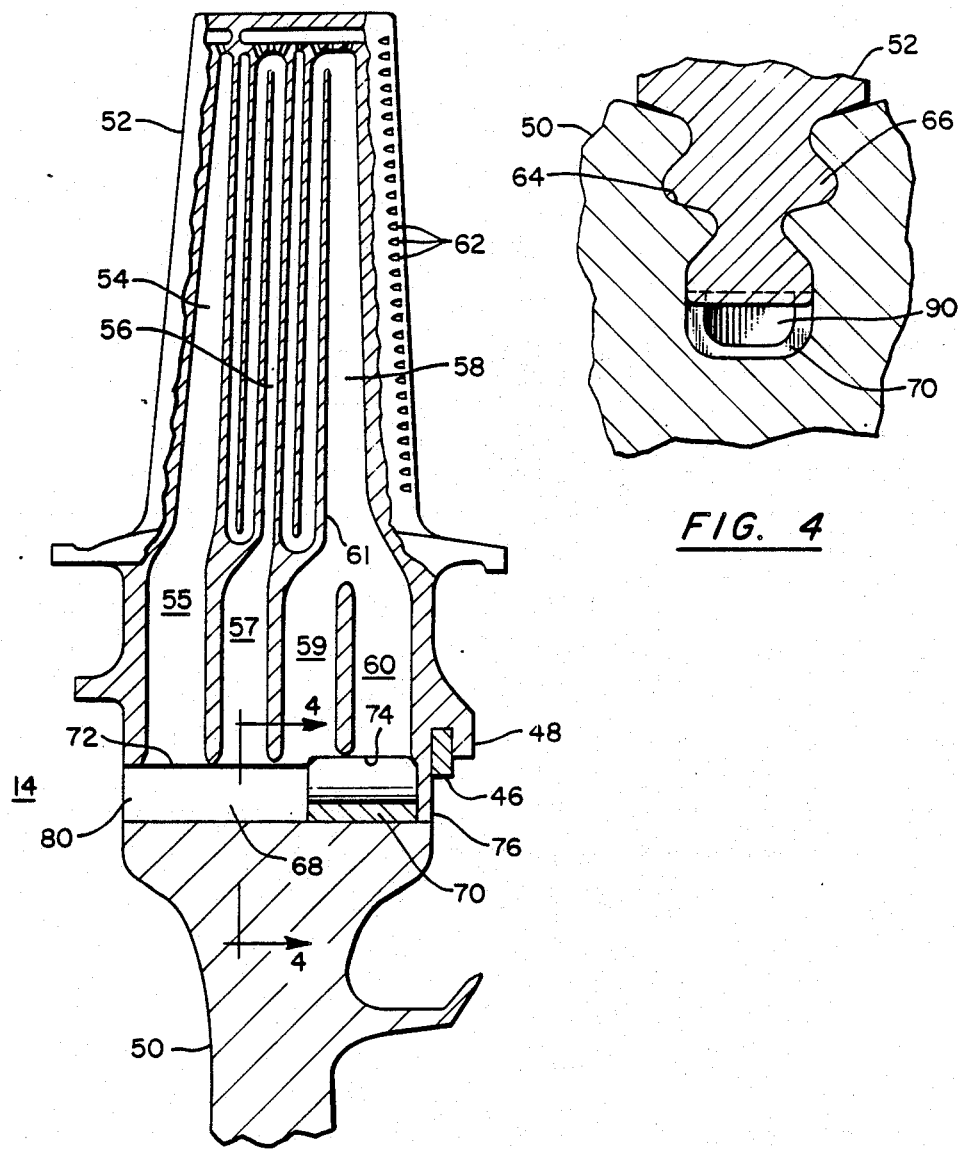
FIG. 3 is a partial section through the disk and blade of the parallel flow cooling embodiment and
FIG. 4 is a section through FIG. 3.

FIG. 3 illustrates an alternate embodiment where a parallel flow path through the blade is used for cooling and wherein the blade retaining plate is omitted. Disk 50 carries a plurality of turbine blades 52 with the supply of high pressure cooling air 14 located on the upstream side of the disk. Each blade 52 includes parallel flow paths 54, 56 and 58 with corresponding inlets 55, 57, 59 and 60. Internal baffle 61 distributes the air with a discharge of air of paths 56 and 58 through openings 62. Air passing through path 54 discharges through openings (not shown) in the leading edge. Again, a generous inlet opening must be provided for an adequate flow of cooling air. In particular, the downstream opening, 59 and 60 should not be unduly restricted. Slots 64 extend axially through the disk forming an axial opening or flow passage 68. Each blade 52 has a dovetail 66 which is shorter than the depth of the opening 64, thereby forming the axial flow path 68.

During trim balancing of the rotor balance weights 70 are located as required within the axial opening 68 toward the second or aft side of the disk. Each weight is of substantially U-shaped as seen in FIG. 4 and is restrained from movement toward the first side by a step 72 in a dovetail of the blade. Recess 74 located at the second or aft side of the disk accepts and retains the weight. A downwardly extending lip 76 forming a portion of the blade closes off the second side of the flow passage 68 and also serves to retain the weight 68. A snap ring 46 engaging a plurality of hooks 48 located on both the disk and the blades retains the blades from axial movement with respect to the disk.

The entire cooling airflow must pass through inlet 80 of the axial passage with portions of this flow passing upwardly through inlets 55, 57, 59 and 60, respectively. With the location of the weight at the second or aft side it can be seen that the majority of the required flow has exited from axial passageway 68 before the location of weight 70 is reached. The weight 70 has an outwardly facing U-shape with the opening in fluid communication with inlets 59 and 60. This provides a residual flow path 90 past the weight. Accordingly, the restriction in flow area caused by the weight 70 is minor and because of the reduced flow passing thereby the airflow to the blade is not compromised.

I claim:

1. An apparatus for balancing a gas turbine rotor having a rotating disk and a plurality of air cooled blades extending from said disk and a supply of cooling air located on a first side of said disk comprising:
   a plurality of axially extending dovetail slots through the outer edge of said disk;
   a mating dovetail on each of said blades, said dovetail shorter than the depth of said dovetail slots, thereby providing an axial opening through said dovetail slot;
   said axial opening open at a first side of said disk in direct fluid communication with said supply of cooling air;
   blocking means at a second side of said disk extending to the full depth of said dovetail slot whereby said axial opening is closed at the second side;
   each blade having at least one cooling flow path therethrough including a radial inlet in fluid communication with said axial opening; and a balance weight located in at least one of said axial openings filling less than all of said axial opening leaving a portion of the opening in fluid communication with said radial inlet.

2. An apparatus as in claim 1:
   each blade having a serpentine cooling flow path therethrough;
   said radial inlet located at the first side of said blade; and
   said weight located at the second side of said blade whereby said axial flow path to said radial opening is unrestricted.

3. An apparatus as in claim 2:
   said dovetail having a radially extending recess at the second side for accepting and retaining said weight.

4. An apparatus as in claim 3:
   said dovetail having at the first side an axially elongated radially inwardly extending ridge, the absence of which establishes said radially extending recess.

5. An apparatus as in claim 4:
   a plurality of annular blade retention plates located at the second side of said disk; and
   said blocking means comprising said retention plate completely covering said axial slot.

6. An apparatus as in claim 1:
   said weight having a cross sectional area filling less than the cross-sectional area of said axial opening, thereby forming a residual opening; and
   said residual opening in fluid communication with at least one of said inlets.

7. An apparatus as in claim 6:
   said blade having a plurality of radial openings in fluid communication with said axial opening;
   said weight located at the second side of said axial opening, whereby the axial opening toward said first side is totally unrestricted.

8. An apparatus as in claim 7:
   said dovetail having a radially extending recess at the second side for accepting and retaining said weight.

9. An apparatus as in claim 6:
   said blocking means comprising an extending lip on said dovetail extending the full depth of said dovetail slot.

10. An apparatus as in claim 8:
    said blocking means comprising an extending lip on said dovetail extending the full depth of said dovetail slot.

* * * * *